United States Patent [19]
Ikeda et al.

[11] Patent Number: 5,566,007
[45] Date of Patent: Oct. 15, 1996

[54] REFLECTION TYPE LIQUID CRYSTAL DISPLAY DEVICE CAPABLE OF COLOR DISPLAY

[75] Inventors: Mitsushi Ikeda; Kouhei Suzuki, both of Yokohama; Fumio Sugiyama, Sagamihara, all of Japan

[73] Assignee: Kabushiki Kaisha Toshiba, Kawasaki, Japan

[21] Appl. No.: 299,625

[22] Filed: Sep. 2, 1994

[30] Foreign Application Priority Data

Sep. 6, 1993 [JP] Japan ..................................... 5-220890

[51] Int. Cl.[6] .............................................. G02F 1/1335
[52] U.S. Cl. .................. 359/40; 359/66; 359/71
[58] Field of Search .................. 359/40, 41, 49, 359/68, 71

[56] References Cited

U.S. PATENT DOCUMENTS

| | | | |
|---|---|---|---|
| 3,905,682 | 9/1975 | Meyerhofer | 359/70 |
| 4,864,390 | 9/1989 | McKechnie et al. | 359/49 |
| 5,221,982 | 6/1993 | Faris | 359/93 |
| 5,307,185 | 4/1994 | Jones et al. | 359/41 |
| 5,341,233 | 8/1994 | Tomoike et al. | 359/83 |
| 5,396,406 | 3/1995 | Ketchpel | 359/48 |

FOREIGN PATENT DOCUMENTS

| | | |
|---|---|---|
| 0353009 | 1/1990 | European Pat. Off. .................. 359/68 |
| 0583150A1 | 2/1994 | European Pat. Off. . |
| 61-210328 | 9/1986 | Japan . |
| 62-293222 | 12/1987 | Japan . |
| 3-278026 | 12/1991 | Japan . |
| 5-196928 | 8/1993 | Japan . |
| 651311 | 2/1994 | Japan ..................................... 359/40 |
| 2152724 | 8/1985 | United Kingdom ..................... 359/40 |

*Primary Examiner*—Anita Pellman Gross
*Assistant Examiner*—James A. Dudek
*Attorney, Agent, or Firm*—Finnegan, Henderson, Farabow, Garrett & Dunner, L.L.P.

[57] ABSTRACT

The present invention provides a liquid crystal display device, having light-converging member provided for each pixel or each pixel row consisting of a plurality of pixels for converging the light incident from the outside, first light path converting member for converting the converged light into a parallel light, light separating member for separating the parallel light into its red-, green- and blue-light components, a liquid crystal cell for controlling the transmitting amount of each light component, and control member for controlling the light transmittance of the liquid crystal cell for a plurality of pixels by applying a voltage to the liquid crystal cell.

9 Claims, 16 Drawing Sheets

......... RED
--------- GREEN
—·—·— BLUE

CONVEX LENZ

CONCAVE LENZ

CONCAVE DIFFRACTION GRATING

REFLECTION TYPE LIQUID CRYSTAL DISPLAY DEVICE CAPABLE OF COLOR DISPLAY

BACKGROUND OF THE INVENTION

1. Field of the Invention

The present invention relates to a liquid crystal display device.

2. Description of the Related Art

In recent years, a liquid crystal display device is widely used as a thin and light-weight display device in personal computers or small TV receivers. Also, vigorous researches are being made in an attempt to use a liquid crystal display device as a large display element in wall-hanging type TV receivers or in electronic computers.

FIG. 1 shows the construction of a conventional color liquid crystal display device. As shown in the drawing, the conventional device comprises an array substrate 241 and a counter substrate 248 disposed to face the array substrate 241. A large number of pixel electrodes 245 and TFT's 242 are alternately formed on the array substrate 241. On the other hand, a large number of absorption type color filters 247 are formed on the counter substrate 248. Only one of the R (red), G (green) and B (blue) components of the light can be transmitted through each of these color filters 247 for display of a color image, with the other light components absorbed by the color filter. In other words, only ⅓ of the light can be utilized in each pixel, leading to a low light utilization efficiency. It should be noted in this connection that a long driving time of the display is required in, particularly, a portable computer, making it very important to improve the light utilization efficiency of the display. It should also be noted that, in the case of using an absorption type color filter, a large number of process steps are required for preparing each of R, G and B regions, leading to a high manufacturing cost of the display device.

When it comes to a projection type color liquid crystal display device, the light is decomposed into the R, G, B components by a dichroic mirror for improving the light utilization efficiency. In this case, three liquid crystal display devices are used for controlling independently the display of the three color components and, then, the three color components are combined again. In this case, required are three sets of a liquid crystal display device and an optical system, leading to a complex structure and a high manufacturing cost.

SUMMARY OF THE INVENTION

The present invention, which has been achieved in an attempt to solve the above-noted problems inherent in the prior art, is intended to provide a liquid crystal display device which permits improving the light utilization efficiency.

According to an aspect of the present invention, there is provided a liquid crystal display device, comprising light-converging means provided for each pixel or each pixel row consisting of a plurality of pixels for converging the light incident from the outside, light path converting means for converting the converged light into a parallel light, light separating means for separating the parallel light into its red-, green- and blue-light components, a liquid crystal cell for controlling the transmitting amount of each light component, and control means for controlling the light transmittance of the liquid crystal cell for a plurality of pixels by applying a voltage to the liquid crystal cell. It is possible for the liquid crystal display device to be of reflection type, which further comprises reflecting means for reflecting the light transmitted through the liquid crystal cell such that the reflected light is incident to the liquid crystal cell inversely.

According to another aspect of the present invention, there is provided a liquid crystal display device, comprising a liquid crystal cell including a pair of substrates consisting of a first substrate having a plurality of interference filters formed thereon and a second substrate having a pixel electrode formed thereon, and a liquid crystal material sandwiched between the pair of the substrates, the light transmittance of the liquid crystal material being changed by voltage application; a wavelength selective interference filter formed on the second substrate for selectively transmitting only that component of the light emitted from a light source which has a predetermined wavelength; and reflecting means for reflecting the light transmitted through the wavelength selective interference filter toward the liquid crystal cell.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

In a liquid crystal display device of the present invention, the light from the outside is converged by a light converging means for each pixel or each pixel row consisting of a plurality of pixels. The converged light is converted into a parallel light by a light path converting means, followed by separating the parallel light into its R-, G- and B light components by a light separating means. Further, each of these separated light components is controlled by a liquid crystal cell. Where the liquid crystal display device is of reflection type, which further comprises a reflecting means, the light reflected by the reflecting means runs in the opposite direction through substantially the same optical path of the incident light so as to be emitted to the outside inversely.

In the device of the present invention, the light emitted from a light source is converged into a light flux having a diameter less than 1/3 of the original light flux, followed by separating the converged light into R-, G- and B-components. Since each of these separated R-, G- and B-components is controlled by a liquid crystal cell, the liquid crystal display device of the present invention permits making the light utilization efficiency about 3 times as high as that in the conventional device using a color filter.

Also, in the liquid crystal display device according to another aspect of the present invention, an interference filter for separating the light emitted from a light source or coming from outside and a reflection plate are mounted on a pair of substrates having a liquid crystal cell interposed therebetween. In this case, the light is repeatedly reflected by the interference filter and the reflection plate such that each color component of the light is finally transmitted through the corresponding interference filter. As a result, all of the R-, G- and B-components of the light can be utilized completely for the display. It follows that the present invention provides a color liquid crystal display device of a direct-viewing type or projection type, which exhibits a high brightness, permits suppressing the power consumption and can be manufactured with a low cost.

Let us describe more in detail the present invention with reference to Examples which follow:

EXAMPLE 1

Figure 1:
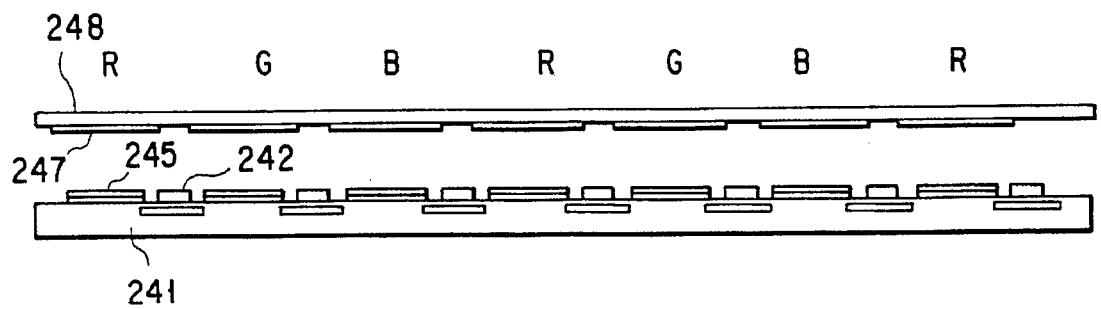
FIG. 1 is a cross sectional view showing a gist portion of a conventional liquid crystal display device.
Figure 2:
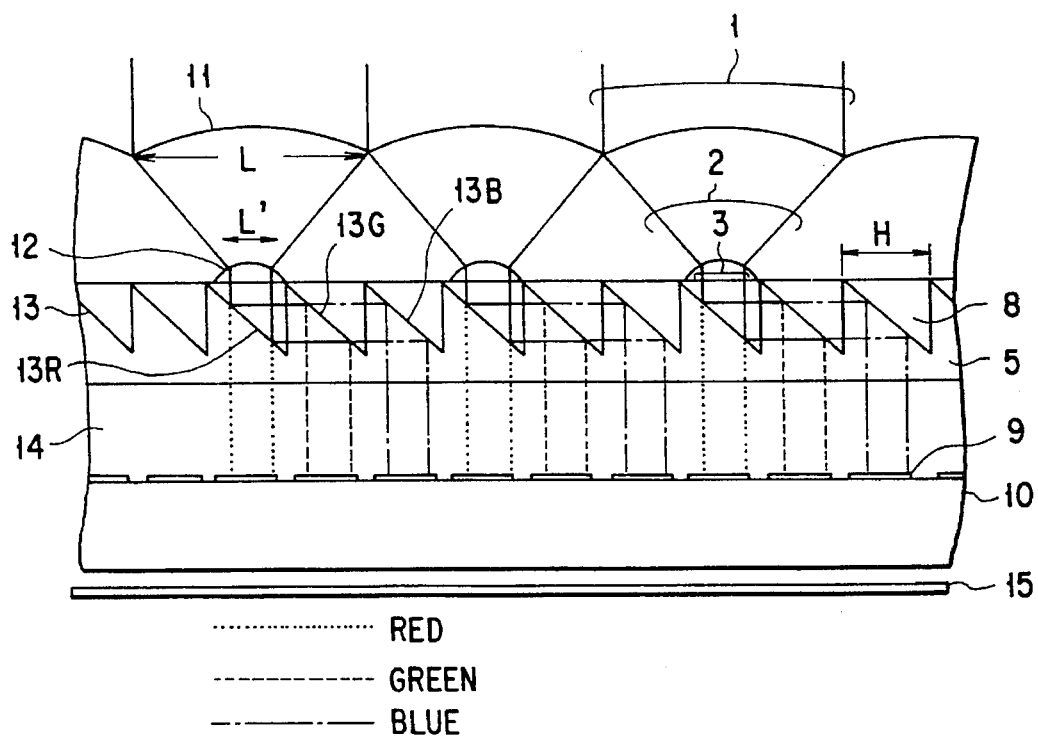
FIG. 2 is a cross sectional view showing a gist portion of a liquid crystal display device according to a first embodiment of the present invention.
Figure 3:
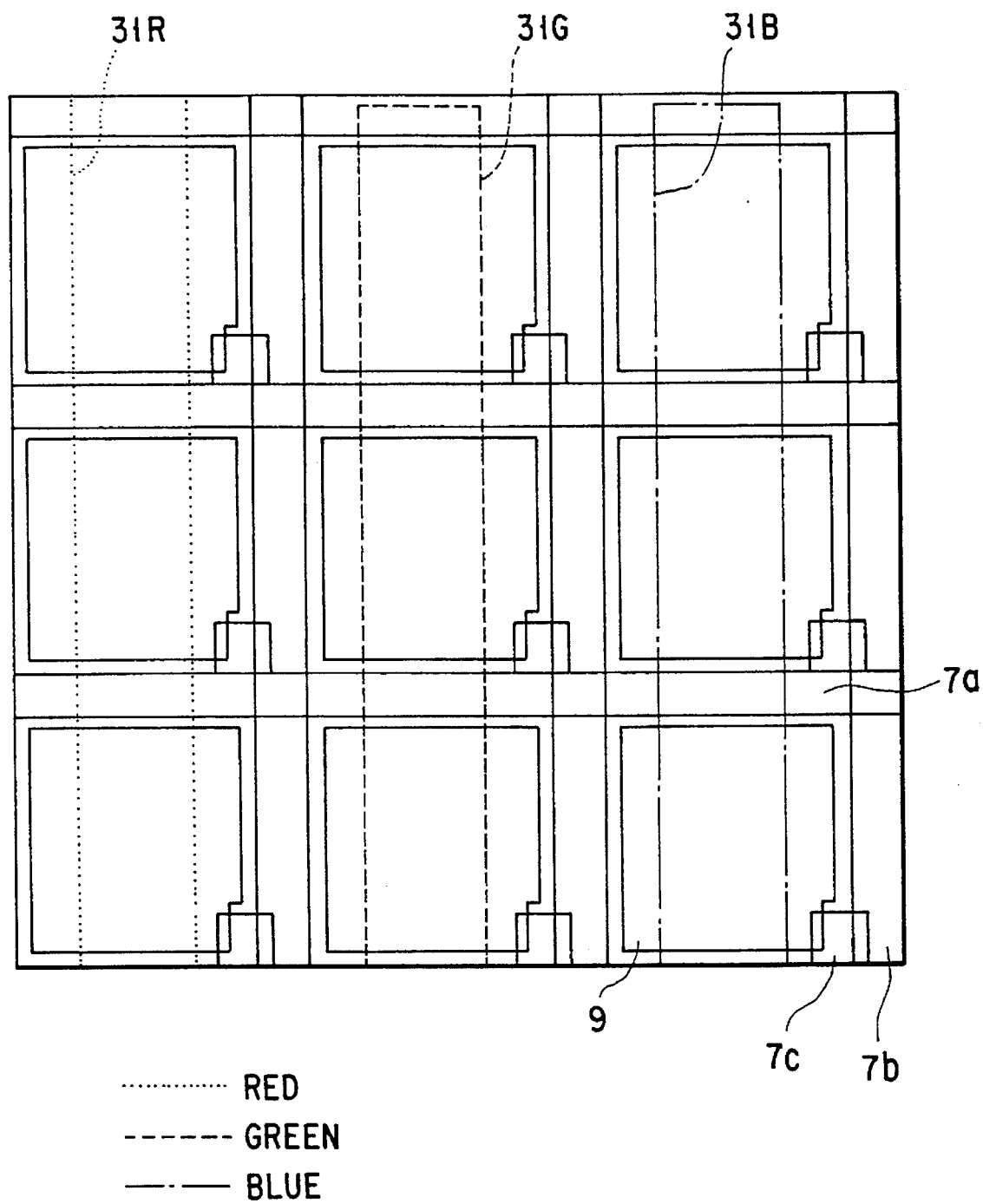
FIGS. 3 and 4 are plan views each showing how a light flux is incident on a liquid crystal cell.
Figure 4:
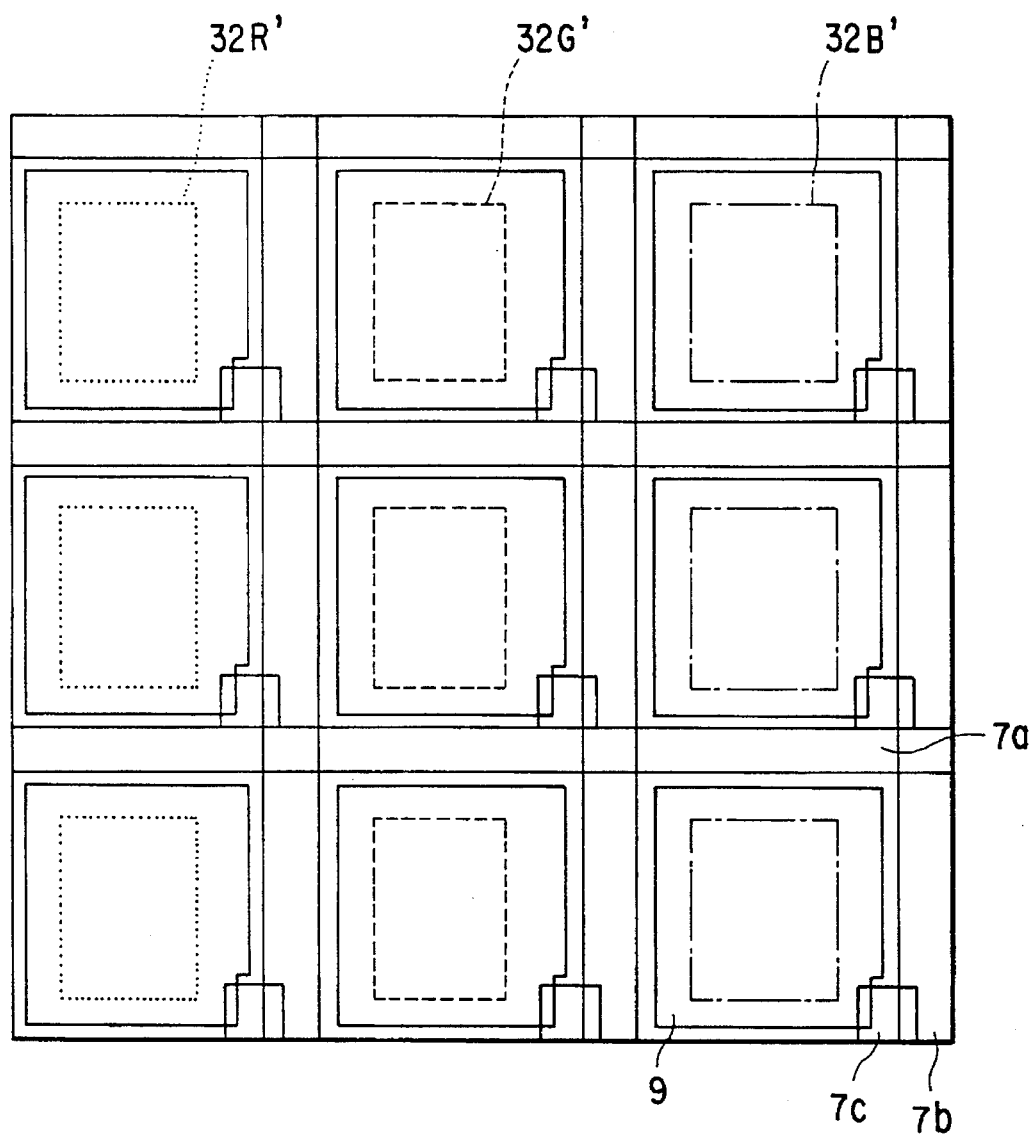

FIG. 2 is a cross sectional view showing a gist portion of a liquid crystal display device according to a first embodiment of the present invention. In this embodiment, a plurality of convex lens arrays 11 for converging an incident light 1 coming from the outside are formed on the display surface. Each convex lens array 11 extends in a vertical direction, i.e., a direction perpendicular to the paper. The width L of each lens included in the convex lens array 11 is set substantially equal to the width of one set of RGB pixels. It is possible for each convex lens array 11 to consist of a plurality of convex lenses linearly arranged in the vertical direction to cover a plurality of pixels, as shown in FIG. 3. It is also possible for the lenses included in the convex lens array to be arranged to cover the pixels separately, as shown in FIG. 4. In this case, it is desirable for the width in the vertical direction of each lens to be smaller than the width in the vertical direction of the pixel.

The incident light fluxes are incident on a liquid crystal cell 14 as shown in FIGS. 3 and 4, when viewed from above. In the case of using a lens array having a semi-elliptical cross section as shown in FIG. 2, each of the light fluxes 31R, 31G, 31B is vertically joined to each other in the central portions of the pixels, as shown in FIG. 3. On the other hand, in the case of using convex lens array consisting of lenses arranged separately from other, each of the light fluxes 32R', 32G', 32B' passes through the central portion of each pixel, as shown in FIG. 4. Incidentally, a gate line 7a, a signal line 7b and a TFT 7c are also shown in each of FIGS. 3 and 4. It is possible to mount a black matrix around a display electrode. In this case, it suffices for the region partitioned by the black matrix to be substantially equal in size to the light flux 32.

A concave lens array 12 for bringing the collected light 2 back to a parallel light 3 is provided below the convex lens array 11. It is desirable for the width L' of the parallel light flux to be set smaller than the width in the lateral direction of the unit pixel.

Glass or a plastic material can be used for forming each of the lens arrays. However, it is desirable to use a plastic material because the lens array can be prepared by an integral molding. When it comes to the convex lens array 11, it is desirable to use a plastic material or glass having a large refractive index in combination with air. Also, it is possible to use a plastic material having a large refractive index in combination with another plastic material having a small refractive index. The concave lens array 12 can be prepared by reversing the construction of the convex lens array 11.

A band-pass filter (interference filter) array 13R, which selectively transmits the red light component alone of the parallel light and reflects the light components of other wavelengths, is arranged below the concave lens array 12 at an angle of about 45° relative to the optical axis of the parallel light. Likewise, a band-pass filter (interference filter) array 13G, which selectively transmits the blue light component alone of the parallel light and reflects the light components of other wavelengths, is arranged below the concave lens array 12 at an angle of about 45° relative to the optical axis of the parallel light. Further, a third array 13B, which consists of simple mirrors or a filter which transmits infrared rays, is arranged below the concave lens array 12 at an angle of about 45° relative to the optical axis of the parallel light. As shown in FIG. 2, each of these arrays 13R, 13G and 13B can be prepared by forming a filter or a mirror 8 by, for example, a vapor deposition or sputtering on the inclined surface, the inclination being about 45° relative to the horizontal plane, of a teeth-shaped transparent member 5 made of glass or a transparent organic film. The width H in the horizontal direction of the filter or mirror in each of the arrays 13R, 13G and 13B is set substantially equal to the width of the unit pixel.

A liquid crystal cell 14 comprising a glass substrate 10 is arranged below the arrays 13R, 13G, 13B with the transparent member 5 interposed therebetween. ITO electrodes 9 are formed on the surface of the glass substrate 10 in a manner to correspond to the arrays 13R, 13G, 13B, respectively. Also, a liquid crystal layer is held between the glass substrate 10 and the transparent member 5. Further, a reflective plate 15 is arranged below the glass substrate 10. The detailed construction of the pixel portion is omitted. For example, it suffices to dispose two polarizing plates to have the liquid crystal cell held therebetween. Alternatively, it suffices to dispose a single polarizing plate by using reflective pixel electrode.

The light incident from the outside is converged by the convex lens array 11 and, then, is brought back to a parallel light by the concave lens array 12. The parallel light formed by the concave lens array 12 is incident to the band-pass filter array 13R which selectively transmits the red light component of the incident light. The red light component transmitted through the array 13R passes through the transparent member 5 so as to be incident to the liquid crystal cell 14. On the other hand, the green and blue light components of the incident light are reflected by the array 13R so as to be incident to the band-pass filter array 13G which selectively transmits the blue light component and reflects the green light component. The green light component reflected by the array 13G is incident to the liquid crystal cell 14. Further, the blue light component transmitted through the array 13G is reflected by the third array 13B so as to be incident to the liquid crystal cell 14.

Transmittance of each of the red, green and blue light components of the light incident to the liquid crystal cell 14 is controlled by a voltage application to the liquid crystal cell 14. The light transmitted through the liquid crystal cell 14 is reflected by the reflective plate 15 arranged below the liquid crystal cell 14. Then, each of the red, green and blue components of the light reflected by the reflective plate 15 runs in the opposite direction through the optical path of the light incident to the reflective plate 15 so as to be emitted to the outside. Specifically, the reflected light runs through the liquid crystal cell 14, the arrays 13R, 13G or 13B, the concave lens 12 and the convex lens 11 so as to be emitted to the outside. The emitted light forms a picture image which is visually recognized.

It is desirable for the liquid crystal display device to be constructed such that the light flux 1 is incident in a direction perpendicular to the liquid crystal cell because the particular construction permits the light reflected by the reflective plate 15 to run in the opposite direction accurately through the optical path of the light incident to the reflective plate 15, with the result that the distribution of the light flux is not changed. Of course, the substantially the same effect can be obtained even if the incident light flux 1 is not perfectly perpendicular, e.g., several degrees deviant, to the liquid crystal cell.

In the embodiment shown in FIG. 2, an interference filter is used as the final stage mirror of the red, green and blue light components. As a result, the ultraviolet light and infrared light are transmitted through the arrays 13R, 13G and 13B. In other words, the ultraviolet light and infrared light are removed from the light incident to the liquid crystal cell so as to prevent the polarizing plate, etc. from being deteriorated or generating heat. Incidentally, it suffices to use a simple reflective mirror for forming the third array 13B.

The liquid crystal cell 14 may be of either an active matrix type or a simple matrix type, as far as the cell 14 is operated in a transparent mode. Also, the technical idea of the present invention can be applied to either a direct-view type display device or a projection type display device. The type of display can be selected by changing the material of the pixel electrode. Further, it is possible to use a liquid crystal display mode other than the TN type mode, if coloring of the light emitted from the liquid crystal display device to the outside as a picture image need not be removed. Black/white GH mode can be used in place of TN mode and in this case only one polarizer is necessary. Where the technical idea of the present invention is applied to a liquid crystal display device of a transmitting mode, it suffices to omit the reflective plate 15 so as to permit light transmission.

As described above, in the embodiment shown in FIG. 2, the light emitted from a light source is converged into a light flux having a diameter less than ⅓ of the original light flux, followed by separating the converged light into R-, G- and B-components. Each of these separated R-, G- and B-components is controlled by a liquid crystal cell, and the controlled light component is reflected by the reflective plate. Further, the reflected light is allowed to run in the opposite direction through the same optical path of the light incident to the reflected light so as to be utilized as a display image light. Alternatively, the light passing through the liquid crystal cell is not reflected so as to use the liquid crystal display device in a transmitting mode. In a reflecting mode, a display electrode may be used as a reflection electrode, which is also applicable to the embodiments which will be described later. It follows that all the visible light components of the light emitted from a light source can be utilized in the embodiment shown in FIG. 2. In other words, the liquid crystal display device of the present invention permits making the light utilization efficiency about 3 times as high as that in the conventional device using a color filter. Further, in the case of using a TN type liquid crystal, the light is incident in a direction substantially perpendicular to the liquid crystal cell, with the result that the view angle dependency is diminished.

EXAMPLE 2

Figure 5:
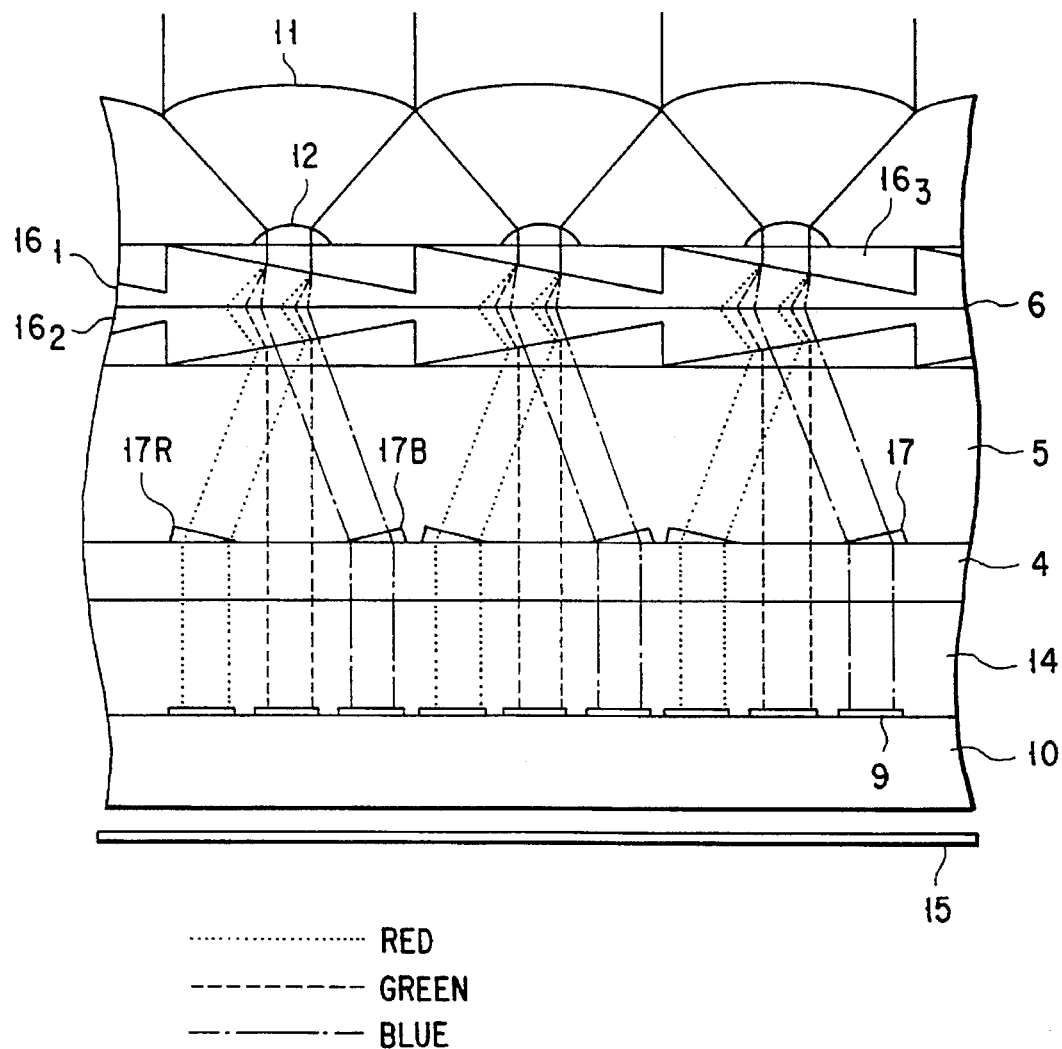
FIG. 5 is a cross sectional view showing a gist portion of a liquid crystal display device according to a second embodiment of the present invention.

FIG. 5 is a cross sectional view showing a gist portion of a liquid crystal display device according to a second embodiment of the present invention. In this 10 embodiment, a convex lens array 11 is arranged on the display surface, and a concave lens array 12 is arranged below the convex lens array 11, as in the first embodiment shown in FIG. 2. These convex lens array 11 and concave lens array 12 are equal to those used in the first embodiment shown in FIG. 2 and, thus, the detailed description thereof is omitted in conjunction with the second embodiment.

As shown in FIG. 5, prism arrays $16_1$, $16_2$ for separating the incident light into its R-, G- and B-components are disposed below the concave lens array 12. It is desirable for the portion denoted by a reference numeral $16_3$ in the drawing to be an air gap or to be formed of a transparent material having a low refractive index. It is possible for the prism included in each of the prism arrays noted above to consist of a single member. However, it is desirable to combine a plurality of members to form the prism such that the running direction of the light ray becomes close to a direction perpendicular to the substrate. Where a plurality of members are combined to form the prism, it is possible to provide an air gap 6 by, for example, using a spacer. It is also possible to bond the prism-forming members to each other by using, for example, an adhesive.

The R-, G- and B-components separated from the incident light by the prism arrays $16_1$, $16_2$ run through a glass member 5 positioned below these prism arrays and, then, through prisms 17, i.e., a R-passing prism 17R and a B-passing prism 17B, positioned in lower portions of the glass member 5. As apparent from the drawing, the running directions of the R- and B-components, which are obliquely incident to the prisms 17R and 17B, respectively, are changed by these prisms 17R and 17B to a direction perpendicular to a glass substrate 4. Incidentally, the G-component separated by the prism arrays runs in a direction perpendicular to the glass substrate 4 and, thus, need not run through a prism before reaching the glass substrate 4. The R-, G-, B-components running through the glass substrate 4 are incident to the liquid crystal cell 14. Then, the transmittance of each of these light components is controlled by a voltage application to the liquid crystal cell 14. The light passing through the liquid crystal cell 14 is reflected by the reflective plate 15 positioned below the liquid crystal cell 14. The reflected light runs in the opposite direction through the optical path of the incident light described above. Specifically, the reflected light runs through the liquid crystal cell 14, the prism arrays $16_2$, $16_1$, the concave lens array 12, and the convex lens array 11 so as to be emitted to the outside. The emitted light is recognized as a picture image.

It is desirable for the liquid crystal display device to be constructed such that the light flux 1 is incident in a direction perpendicular to the liquid crystal cell because the particular construction permits the light reflected by the reflective plate 15 to run in the opposite direction accurately through the optical path of the light incident to the reflective plate 15, with the result that the distribution of the light flux is not changed. Of course, the substantially the same effect can be obtained even if the incident light flux 1 is not perfectly perpendicular, e.g., several degrees deviant, to the liquid crystal cell. It suffices to provide a single reflective plate, or two reflective plates may be disposed to have the liquid crystal cell sandwiched therebetween. To enable the light flux to be incident to the liquid crystal cell perpendicularly, a lens or a mirror can be used in place of the prism shown in FIG. 5. The liquid crystal cell 14 may be of either an active matrix type or a simple matrix type, as far as the liquid crystal display device is operated in a transparent mode. Also, it is possible to use a liquid crystal display mode other than the TN type mode, if coloring of the light emitted to the outside as a picture image need not be removed. Where the technical idea of the present invention is applied to a liquid crystal display device of a transmitting mode, it suffices to omit the reflective plate 15 so as to permit light transmission.

EXAMPLE 3

Figure 6:
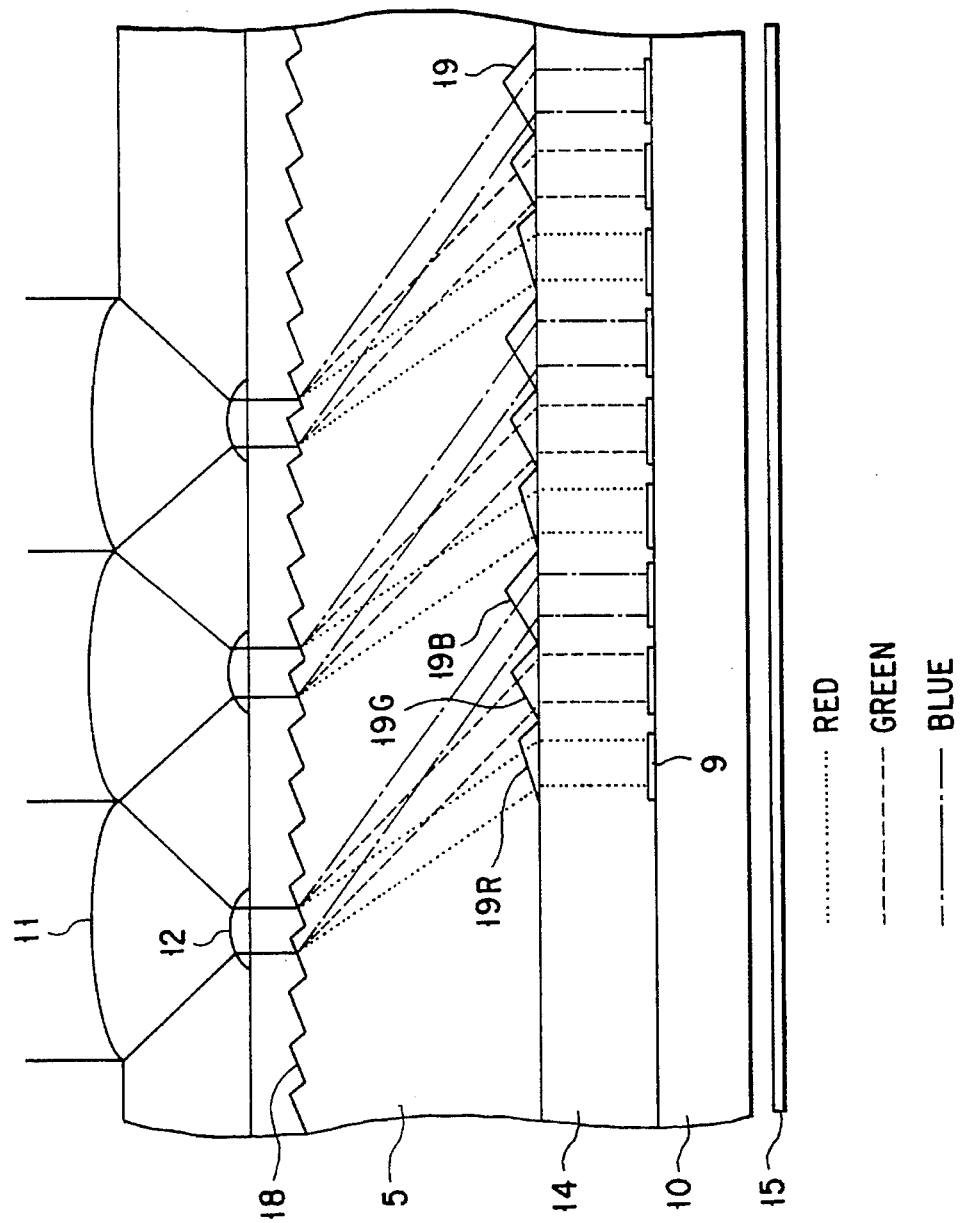
FIG. 6 is a cross sectional view showing a gist portion of a liquid crystal display device according to a third embodiment of the present invention.

FIG. 6 is a cross sectional view showing a gist portion of a liquid crystal display device according to a third embodiment of the present invention. In this embodiment, a convex lens array 11 is arranged on the display surface, and a concave lens array 12 is arranged below the convex lens array 11, as in the first embodiment shown in FIG. 2. These convex lens array 11 and concave lens array 12 are equal to those used in the first embodiment shown in FIG. 2 and, thus, the detailed description thereof is omitted in conjunction with the third embodiment.

As shown in FIG. 6, a diffraction grating 18 for separating the incident light into its R-, G- and B-components is disposed below the concave lens array 12. The R-, G- and B-components separated from the incident light by the diffraction grating 18 run through a glass member 5 positioned below the diffraction grating 18 and, then, through prisms 19, i.e., a R-passing prism 19R, a G-passing prism 19G, and a B-passing prism 17B, positioned in lower portions of the glass member 5. As apparent from the drawing, the running directions of these separated light components, which are obliquely incident to these prisms 19R, 19B, and 17B, respectively, are changed by these prisms to a direction perpendicular to a glass substrate 10. The transmittance of each of these light components which are incident to the liquid crystal cell 14 is controlled by a voltage application to the liquid crystal cell 14. The light passing through the liquid crystal cell 14 is reflected by the reflective plate 15 positioned below the liquid crystal cell 14. The reflected light runs in the opposite direction through the optical path of the incident light described above. Specifically, the reflected light runs through the liquid crystal cell 14, the diffraction grating 18, the concave lens array 12, and the convex lens array 11 so as to be emitted to the outside. The emitted light is recognized as a picture image.

The liquid crystal display device of the construction described above permits producing effects similar to those produced by the devices according to the first and second embodiments of the present invention shown in FIGS. 2 and 5.

It is desirable for the liquid crystal display device to be constructed such that the light flux 1 is incident in a direction perpendicular to the liquid crystal cell because the particular construction permits the light reflected by the reflective plate 15 to run in the opposite direction accurately through the optical path of the light incident to the reflective plate 15, with the result that the distribution of the light flux is not changed. Of course, the substantially the same effect can be obtained even if the incident light flux 1 is not perfectly perpendicular, e.g., several degrees deviant, to the liquid crystal cell. It suffices to provide a single reflective plate, or two reflective plates may be disposed to have the liquid crystal cell sandwiched therebetween. The liquid crystal cell 14 may be of either an active matrix type or a simple matrix type, as far as the liquid crystal display device is operated in a transparent mode. Also, it is possible to use a liquid crystal display mode other than the TN type mode, if coloring of the light emitted to the outside as a picture image need not be removed. Further, the diffraction grating 18 may be formed of a plastic material or glass. Where the technical idea of the present invention is applied to a liquid crystal display device of a transmitting mode, it suffices to omit the reflective plate 15 so as to permit light transmission.

EXAMPLE 4

Figure 7:
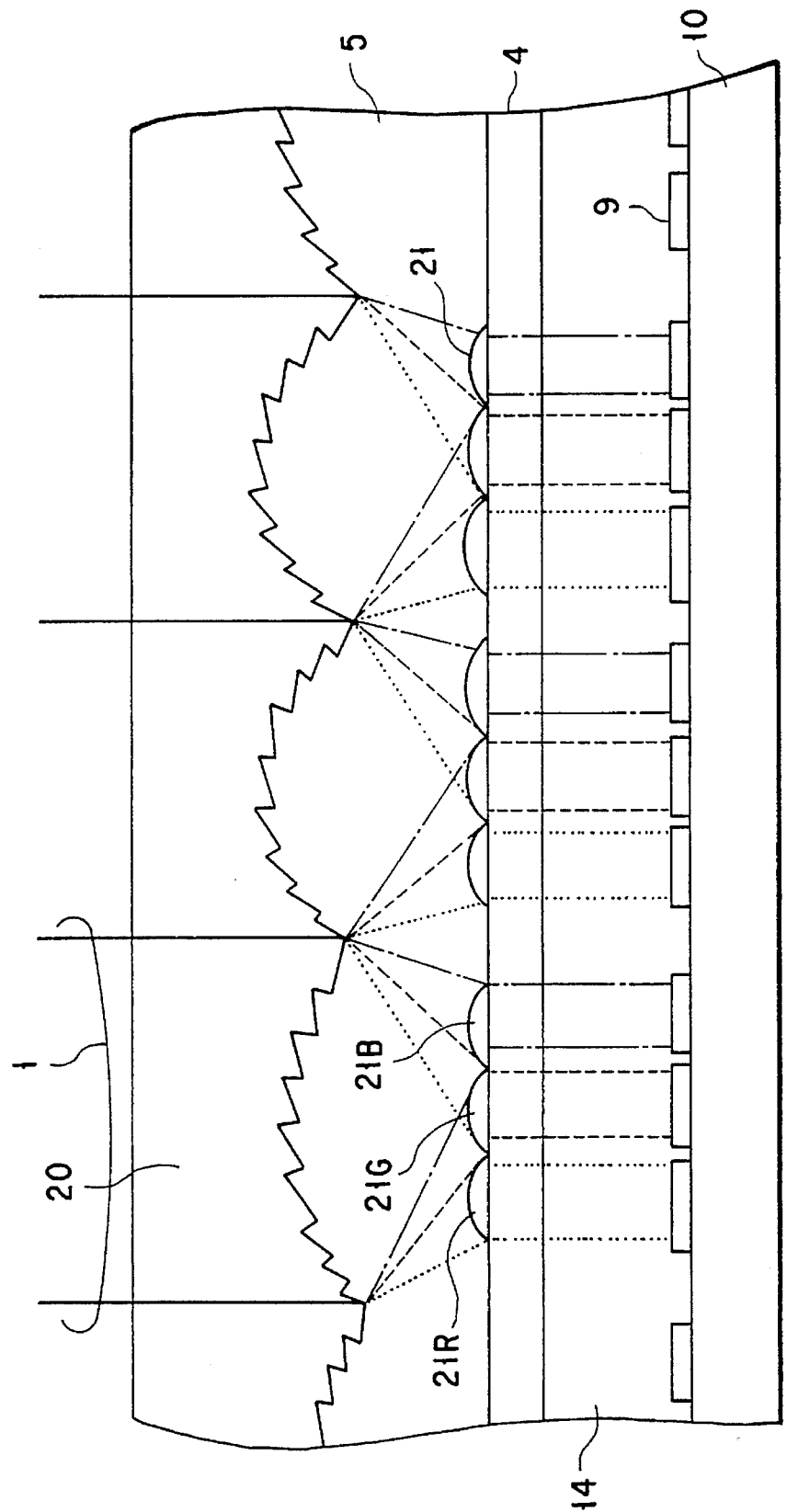
FIG. 7 is a cross sectional view showing a gist portion of a liquid crystal display device according to a fourth embodiment of the present invention.

FIG. 7 is a cross sectional view showing a gist portion of a liquid crystal display device according to a fourth embodiment of the present invention. The fourth embodiment resembles in construction the third embodiment shown in FIG. 6, except that a diffraction grating 20 is formed in a concave configuration to collect the diffracted light in the fourth embodiment shown in FIG. 7 in place of the construction employed in the third embodiment that the convex lens array 11, the concave lens array 12 and the diffraction grating 18 for separating the incident light into its R-, G-, B-components are formed on the display surface as shown in FIG. 6.

In the embodiment shown in FIG. 7, the R-, G- and B-components separated from the incident light by the diffraction grating 20 run through a glass member 5 positioned below the diffraction grating 20 and, then, through deformation lenses 21, i.e., a R-component deforming lens 21R, a G-component deforming lens 21G, and a B-component deforming lens 21B, positioned in lower portions of the glass member 5. As apparent from the drawing, the running directions of these separated light components, which are obliquely incident to these deformation lenses 21R, 21B, and 21B, respectively, are changed by these lenses to a direction perpendicular to a glass substrate 4. The transmittance of each of these light components which are incident to the liquid crystal cell 14 is controlled by a voltage application to the liquid crystal cell 14. The light passing through the liquid crystal cell 14 is used for the display. It is possible to dispose a reflective plate below the liquid crystal cell 14 so as to use the apparatus as a reflection type liquid crystal display apparatus. In this case, the reflected light runs in the opposite direction through the optical path of the incident light described above. Specifically, the reflected light runs through the liquid crystal cell 14, the deformation lenses 21R, 21G, 21B, and the concave lens array 12, so as to be emitted to the outside. The emitted light is recognized as a picture image.

It is desirable for the liquid crystal display device to be constructed such that the light flux 1 is incident in a direction perpendicular to the liquid crystal cell because the particular construction permits the light reflected by the reflective plate 15 to run in the opposite direction accurately through the optical path of the light incident to the reflective plate 15, with the result that the distribution of the light flux is not changed. Of course, the substantially the same effect can be obtained even if the incident light flux 1 is not perfectly perpendicular, e.g., several degrees deviant, to the liquid crystal cell. It suffices to provide a single reflective plate, or two reflective plates may be disposed to have the liquid crystal cell sandwiched therebetween. The liquid crystal cell 14 may be of either an active matrix type or a simple matrix type, as far as the liquid crystal display device is operated in a transparent mode. Also, it is possible to use a liquid crystal display mode other than the TN type mode, if coloring of the light emitted to the outside as a picture image need not be removed. Incidentally, a prism as used in the third embodiment shown in FIG. 6 can be used for converting the incident light to the liquid crystal cell into a parallel light in place of using a glass member having a large refractive index.

The construction employed in the fourth embodiment shown in FIG. 7 also produces the effects similar to those produced by the constructions employed in the other embodiments described previously. Further, a lens and a prism are not required in the fourth embodiment, with the result that the liquid crystal display device of a simpler construction can be manufactured with a lower cost.

EXAMPLE 5

Figure 8:
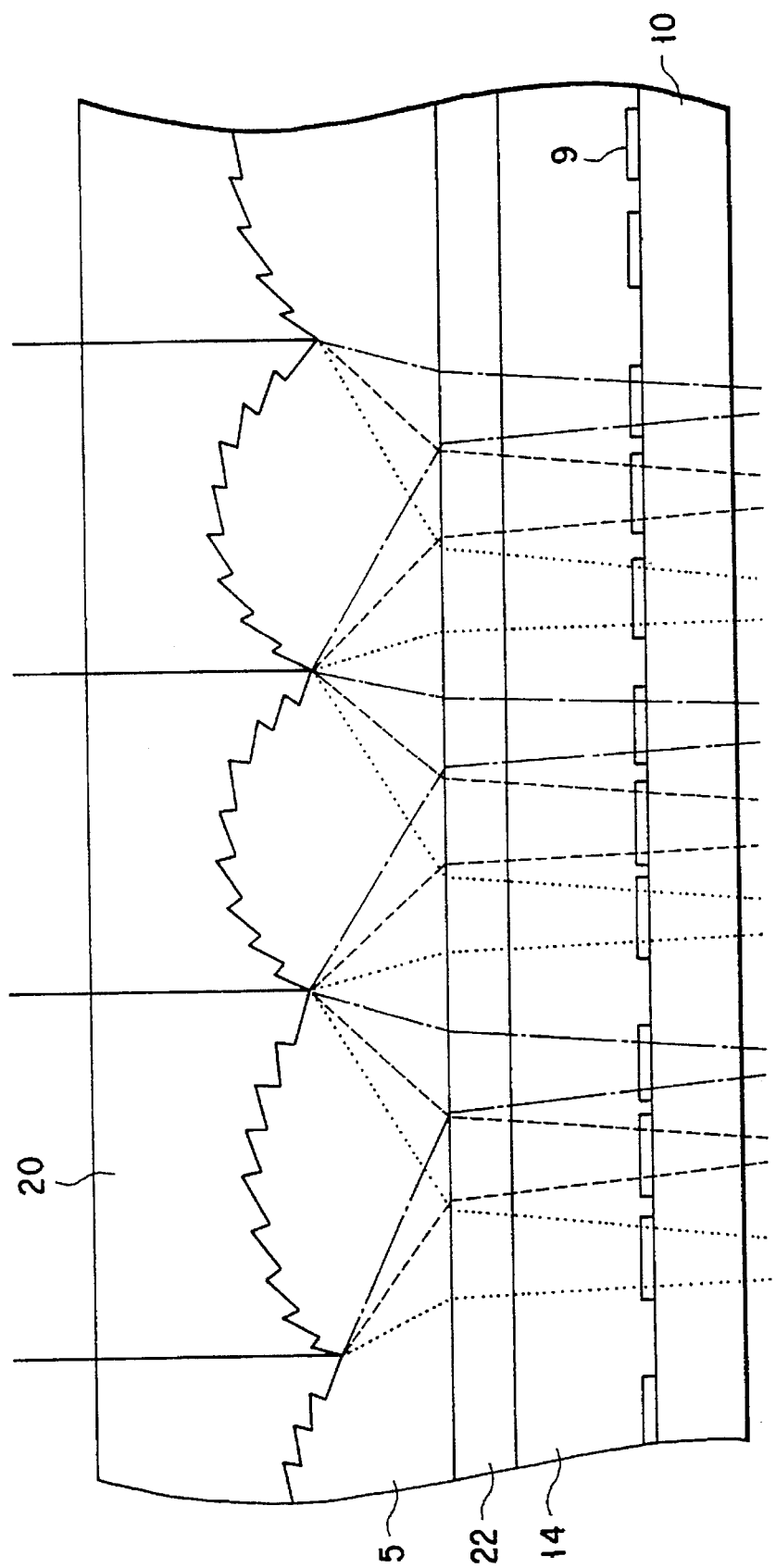
FIG. 8 is a cross sectional view showing a gist portion of a liquid crystal display device according to a fifth embodiment of the present invention.

FIG. 8 is a cross sectional view showing a gist portion of a liquid crystal display device according to a fifth embodiment of the present invention. The fifth embodiment resembles in construction the fourth embodiment shown in FIG. 7, except that a transparent substrate 22 made of a material having a large refractive index is used in the fifth embodiment shown in FIG. 8 in place of the deformation lenses 21R, 21G, 21B used in the embodiment shown in FIG. 7. In the embodiment of FIG. 8, the fluxes of the separated R-, G-, B-components are converted by the transparent substrate 22 into light fluxes running in a direction substantially perpendicular to the substrate. Of course, the construction employed in the embodiment of FIG. 8 also produces the similar effects. Further, the fifth embodiment shown in FIG. 8 is simple in construction, leading to a simplified manufacturing process.

EXAMPLE 6

Figure 9:
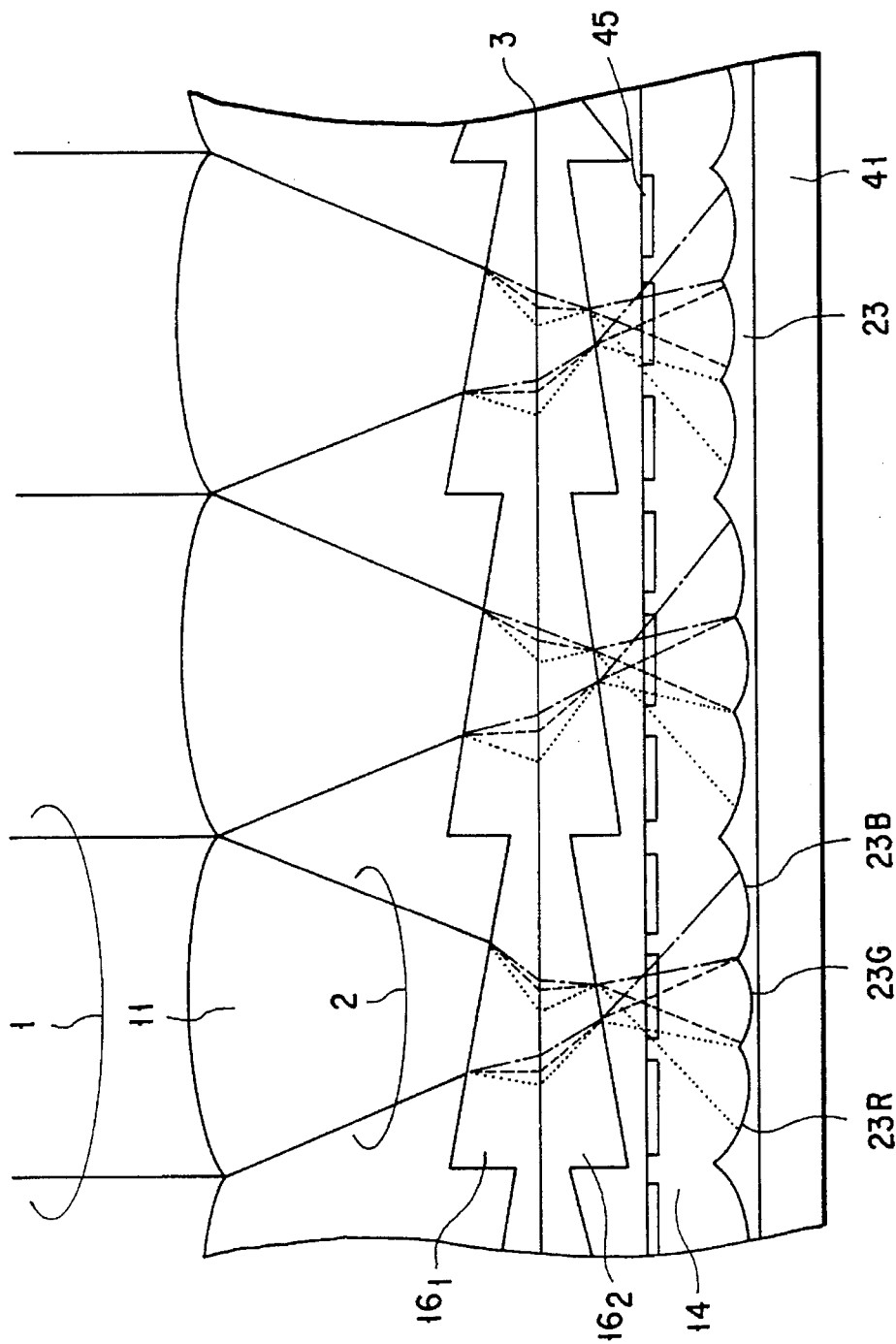
FIG. 9 is a cross sectional view showing a gist portion of a liquid crystal display device according to a sixth embodiment of the present invention.

FIG. 9 is a cross sectional view showing a gist portion of a liquid crystal display device according to a sixth embodiment of the present invention. The sixth embodiment resembles in construction the second embodiment shown in FIG. 5. Specifically, in the embodiment shown in FIG. 5, the light flux converged by the convex lens 12 is brought back into a parallel light by the concave lens. In the embodiment shown in FIG. 9, however, the converged light flux is not brought back into a parallel light, but is directly separated into its R-, G-, B-components. When the separated light components are reflected by a cell substrate 41, concave mirrors 23, i.e., mirrors 23R, 23G, 23B, allow these light components to run in the opposite direction through the optical paths of the incident light components. The concave mirror 23 may be constructed to act also as a pixel electrode 45 or as a common electrode for a counter substrate. Alternatively, the concave mirror may be provided in a lower portion of the lower substrate 41 separately from an electrode for display.

EXAMPLE 7

Figure 10:
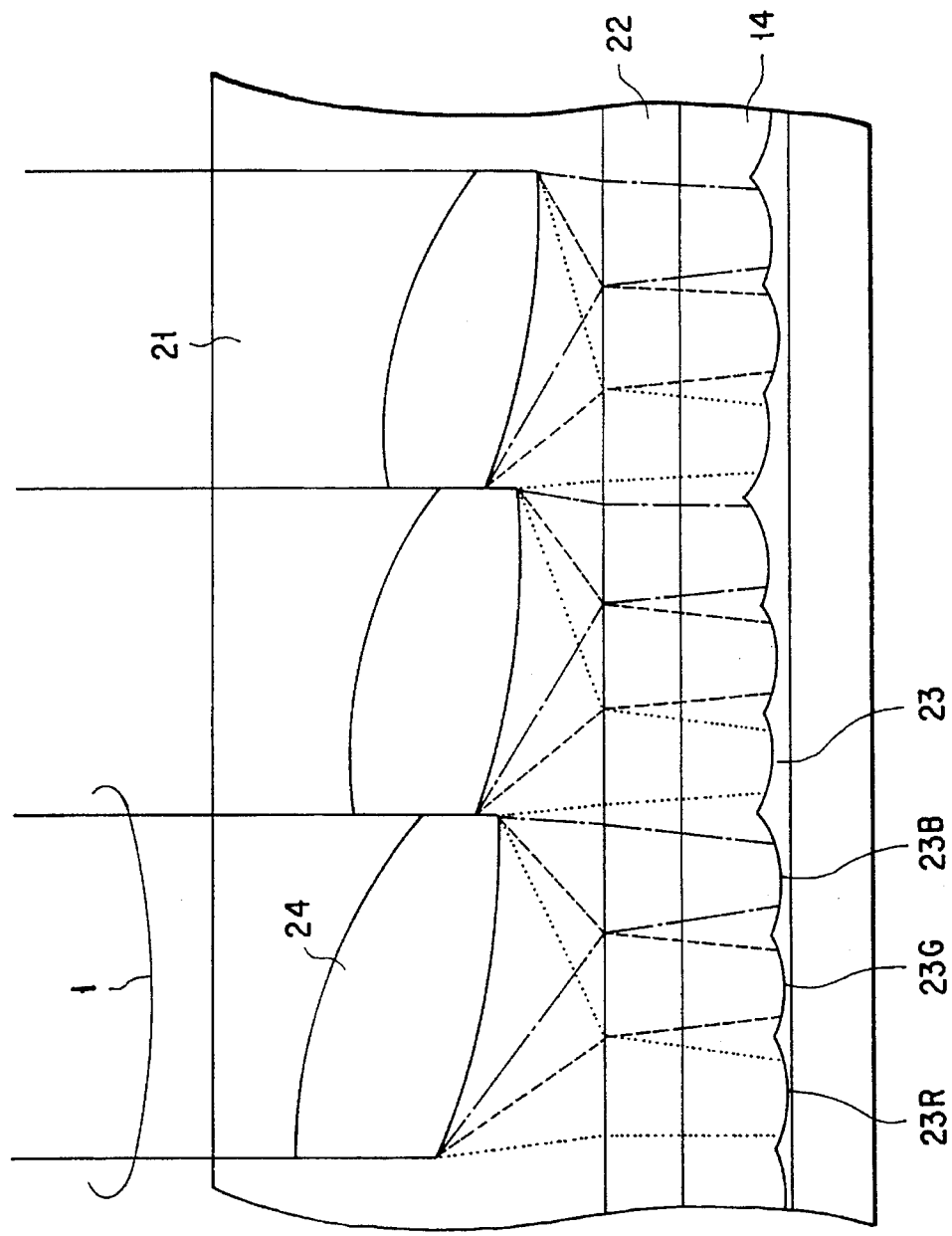
FIG. 10 is a cross sectional view showing a gist portion of a liquid crystal display device according to a seventh embodiment of the present invention.
Figure 11A:
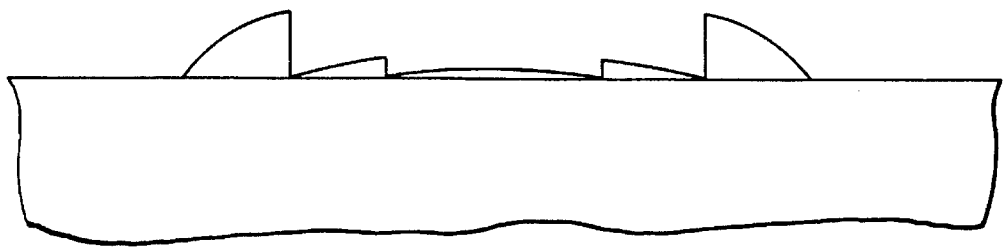
FIGS. 11A to 11C show Fresnel type lenses and diffraction gratings.
Figure 11B:
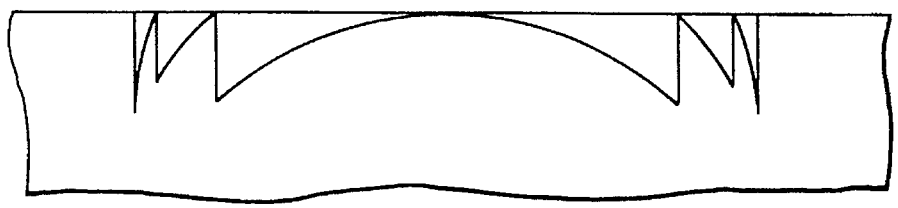
Figure 11C:
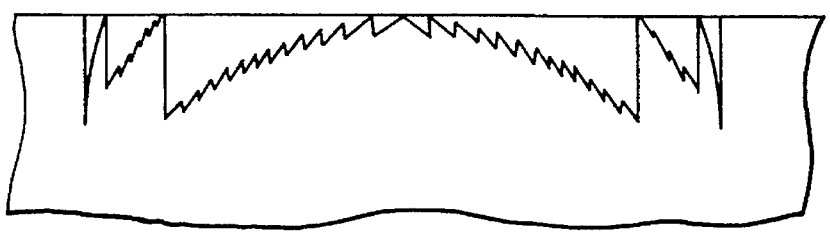

FIG. 10 is a cross sectional view showing a gist portion of a liquid crystal display device according to a seventh embodiment of the present invention. A portion covering three pixels alone is shown in FIG. 10. In this embodiment, a deforming prism 24 is used for converging each of the separated light components as shown in FIG. 10 in place of the deformed diffraction grating 20 used in the fifth embodiment shown in FIG. 8. Incidentally, a concave lens, a convex lens or a diffraction grating of Fresnel type, which are shown in FIGS. 11A, 11B, 11C, respectively, can be used in place of the lens or diffraction grating used in each of the embodiments described previously so as to decrease the thickness of the entire apparatus.

As described above, the light flux emitted from a light source is converged to have a width less than about ⅓ of the width of the light flux emitted from the light source in each of the embodiments described above. Then, the converged light flux is separated into its R-, G-, B-components. Further, transmittance of the separated light components is controlled by a liquid crystal and, then, the light components passing through the liquid crystal are reflected by a reflective plate to allow the reflected light components to run in the opposite direction through the optical paths of the incident light components. The reflected light components are converged again for use as a display light. Alternatively, the light components having the transmittance controlled by the liquid crystal are not reflected for using the apparatus in a transmitting mode. A light separating method utilizing a principle other than those employed in the embodiments described above can also be employed, with substantially the same results. The particular technique employed in the present invention makes it possible to utilize all the visible light emitted from the light source. It follows that the present invention permits improving the light utilization efficiency to about 3 times as high as that in the conventional system utilizing a color filter. Also, in the case of using a TN type liquid crystal, the light is enabled to be incident in a direction close to a direction perpendicular to the substrate so as to diminish the view angle dependency of the liquid crystal display device. Other LC mode than TN type can be used like black/white GH type.

EXAMPLE 8

Figure 12:
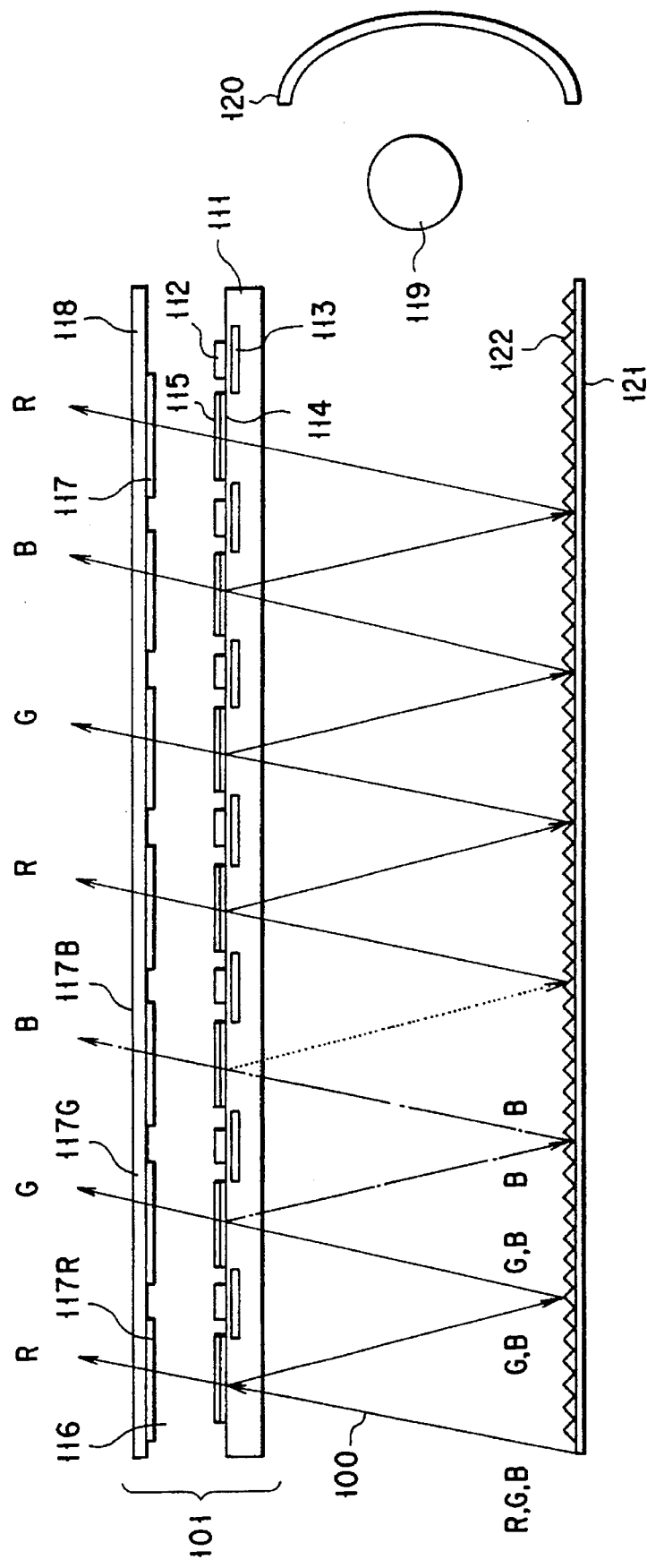
FIG. 12 is a cross sectional view showing a gist portion of a liquid crystal display device according to an eighth embodiment of the present invention.

FIG. 12 is a cross sectional view showing a gist portion of a liquid crystal display device according to an eighth embodiment of the present invention. In this embodiment, a thin film transistor array 112, a wavelength selective interference filters 114, and ITO pixel electrodes 115 are formed on a transparent glass substrate 111, as shown in FIG. 12. A transparent electrode (not shown) is formed on the entire surface of a counter substrate 118. An orienting layer is formed on the surface of each of these two substrates. Further, a liquid crystal material 116 is sealed between the two substrates so as to form a TFT type liquid crystal cell.

In order to prevent an external light from being reflected by the interference filter 114, it is possible to form color filters (color decomposing filters) 117, i.e., color filters 117R, 117G, 117B which selectively transmits the red, green and blue light components, respectively, for a color equal to the color of the transmitted light on the surface of the counter substrate 118, as shown in FIG. 12. It is also possible for the color filter 117 to be laminated on the interference filter 114. FIG. 12 also shows a TFT 112 and a reflective layer 113.

A light source 119 for the back light is disposed sideward of an array 101. Also, a light conductive plate 121 is disposed below the array 101. A reflective film 122 is formed on the inner surface of the light conductive plate 121, with the result that the lower portion of the array 101 is illuminated by the light conductive plate 121. It suffices for the reflective film 122 to reflect the light emitted from the array 101 to permit the reflected light to illuminate again the array 101. It is possible for the reflective film to have a flat surface. However, the reflective film should desirably have a light scattering surface.

In the eighth embodiment shown in FIG. 12, the light 100 emitted from a light source is reflected by the transparent glass substrate 111 and, then, the reflected light is further reflected by the light conductive plate 121. In this fashion, the light 100 is repeatedly reflected by the transparent glass substrate 111 and the light conductive plate 121. During this repetition, a predetermined color component of the light is selectively transmitted through the interference filter 114 every time the light reaches the transparent glass substrate 111. For example, the red light component of the light 100 is selectively transmitted through the color filter 117R, with the other light components, i.e., green and blue light components, being reflected by the transparent glass substrate 111. These green and blue light components are further reflected by the light conductive plate 121 so as to be incident to the color filter 117G formed on the transparent glass substrate 111. In this case, the green light component is selectively transmitted through the color filter 117G, with the remaining blue light component being reflected. The reflected blue light component is further reflected by the light conductive plate 121 so as to be incident to the color filter 117B formed on the transparent glass substrate 111. In this case, the blue light component is transmitted through the color filter 117B.

As described above, the light emitted from a light source is repeatedly reflected by the color filter 117 and the reflective film 122. During the repetition, the red, green and blue components of the light are transmitted through the color filters 117R, 117G and 117B, respectively. It follows that it is possible to utilize all of the three primary color components of the light, with the result that the light utilization efficiency can be improved to about 3 times as high as in the system using the conventional color filter. The improvement in the light utilization efficiency permits increasing the brightness of the display screen and also permits suppressing the power consumption.

EXAMPLE 9

Figure 13A:
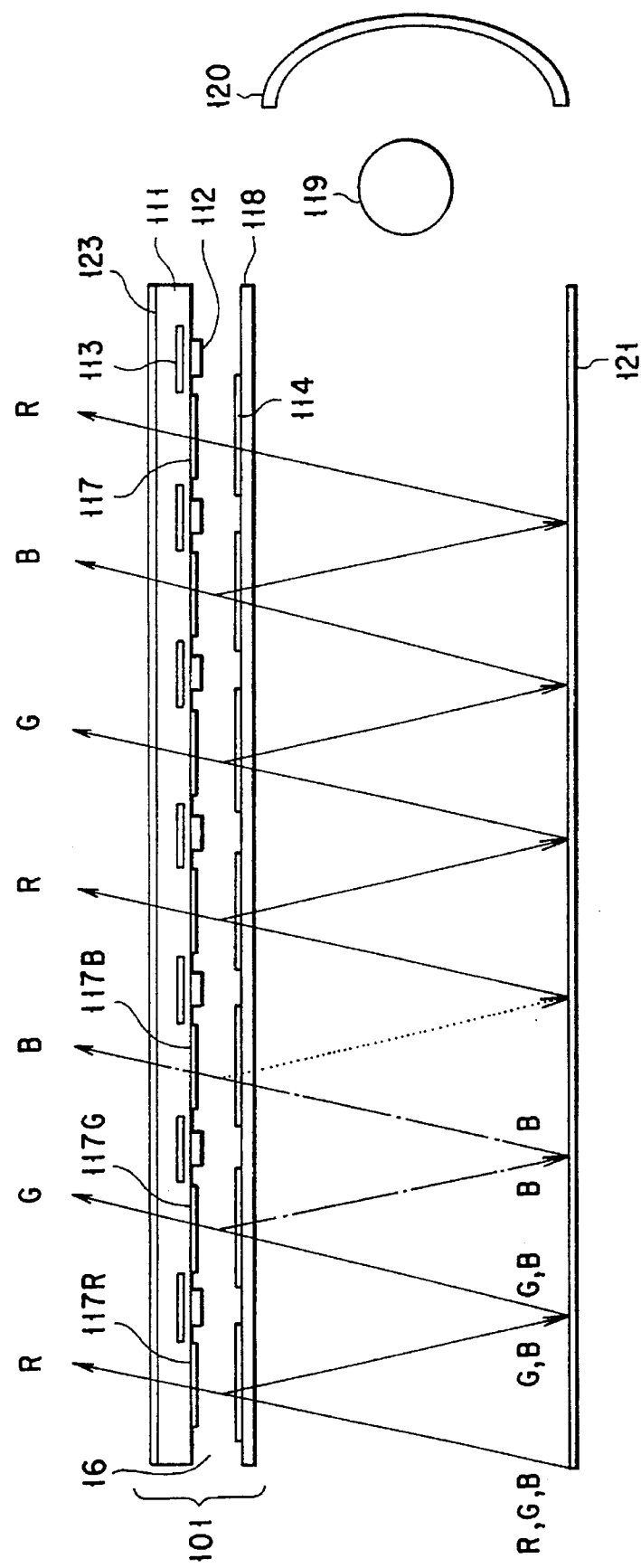
FIG. 13A to 13C is a cross sectional view showing a gist portion of a liquid crystal display device according to a ninth embodiment of the present invention.
Figure 13B:
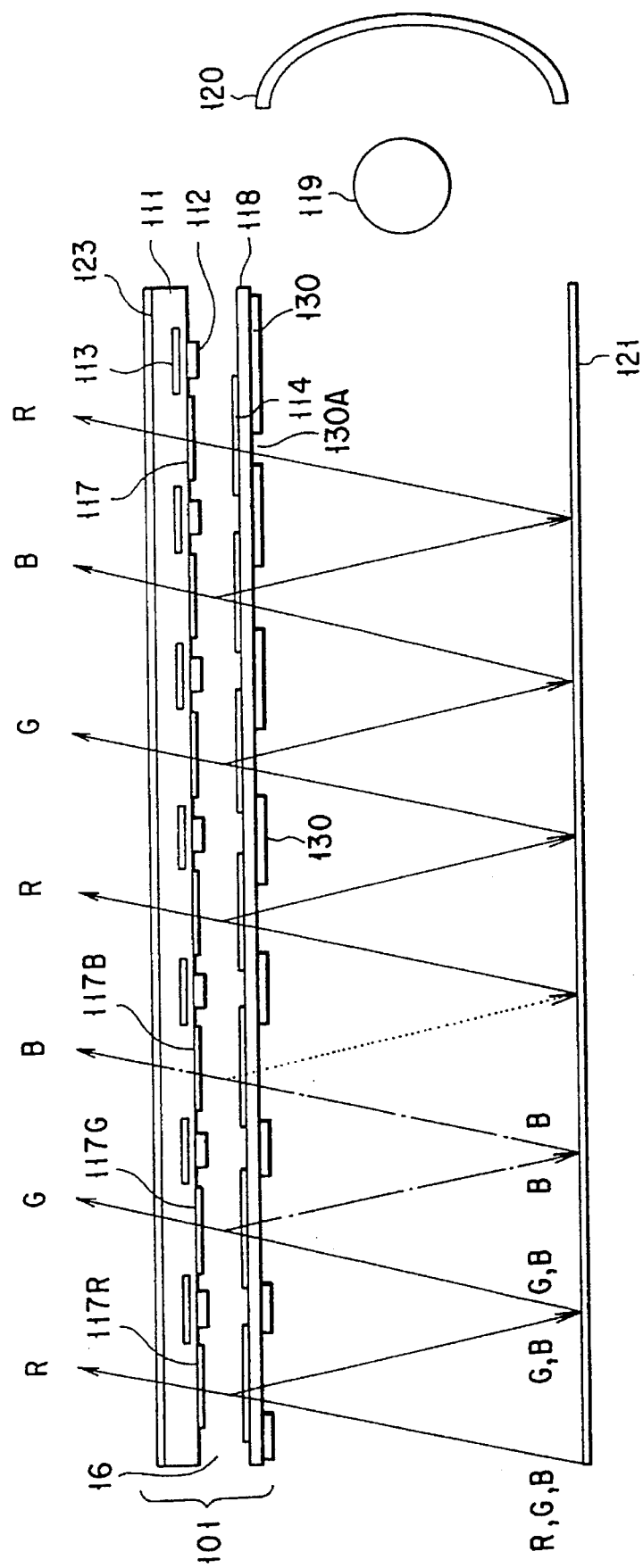
Figure 13C:
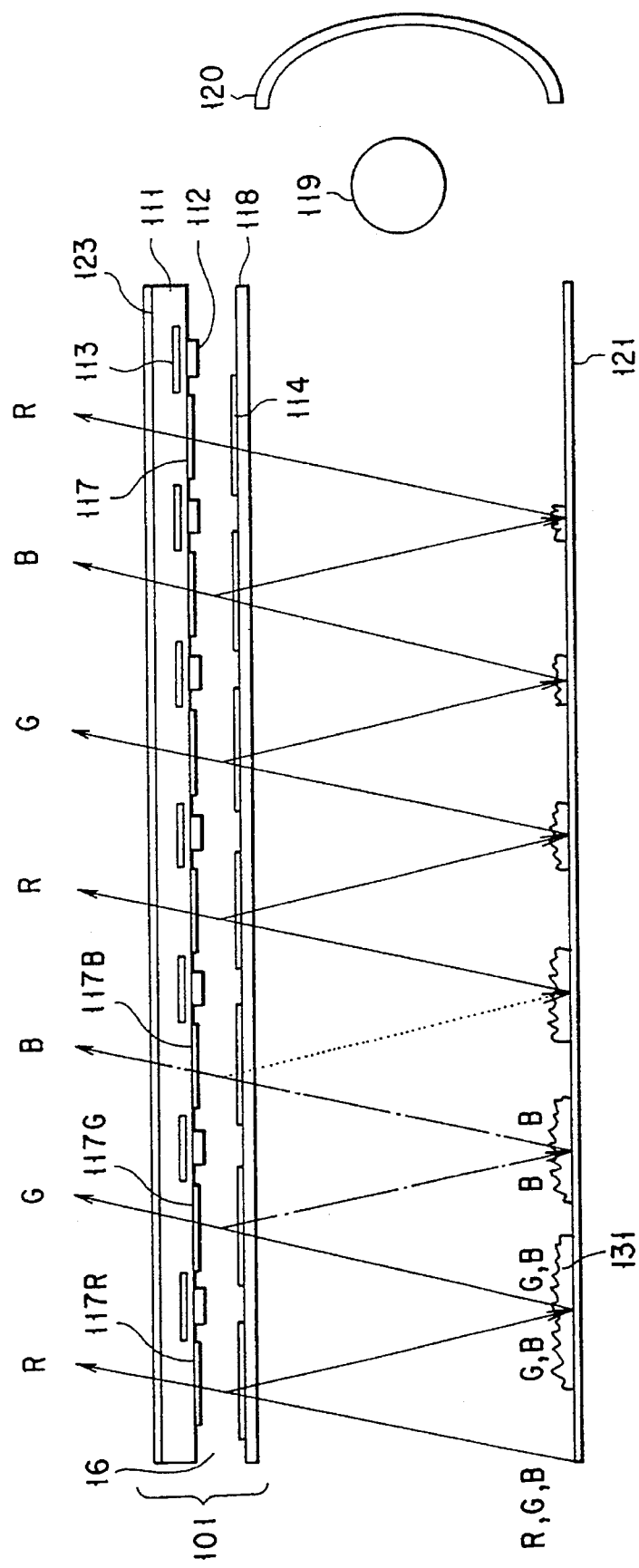

FIG. 13A is a cross sectional view showing a gist portion of a liquid crystal display device according to a ninth embodiment of the present invention. This embodiment is substantially equal to the eighth embodiment shown in FIG. 12, except that the positional relationship between the transparent glass substrate 111 and the counter electrode 118 is reversed. To be more specific, the counter electrode 118 is positioned below the transparent glass substrate 111 in the ninth embodiment shown in FIG. 13. Also, the interference filter 114 is formed on the upper surface of the counter electrode 118. Further, an anti-reflection film 123 is formed on the uppermost surface of the transparent glass substrate 111. Alternatively, a polarizing plate may be enabled to perform the function of preventing light reflection. The ninth embodiment shown in FIG. 13 also produces an effect similar to that produced by the eighth embodiment shown in FIG. 12. Usually as the propagation of the light inside of the light guide, the intensity decreases. Therefore, the portion of the transmitted light can be increased by making the aperture 130A of the mirror 130 grater as going to the inside as FIG. 13B. Similarly the light scattering portion 131 can be larger by going into the inside as FIG. 13C.

EXAMPLE 10

Figure 14:
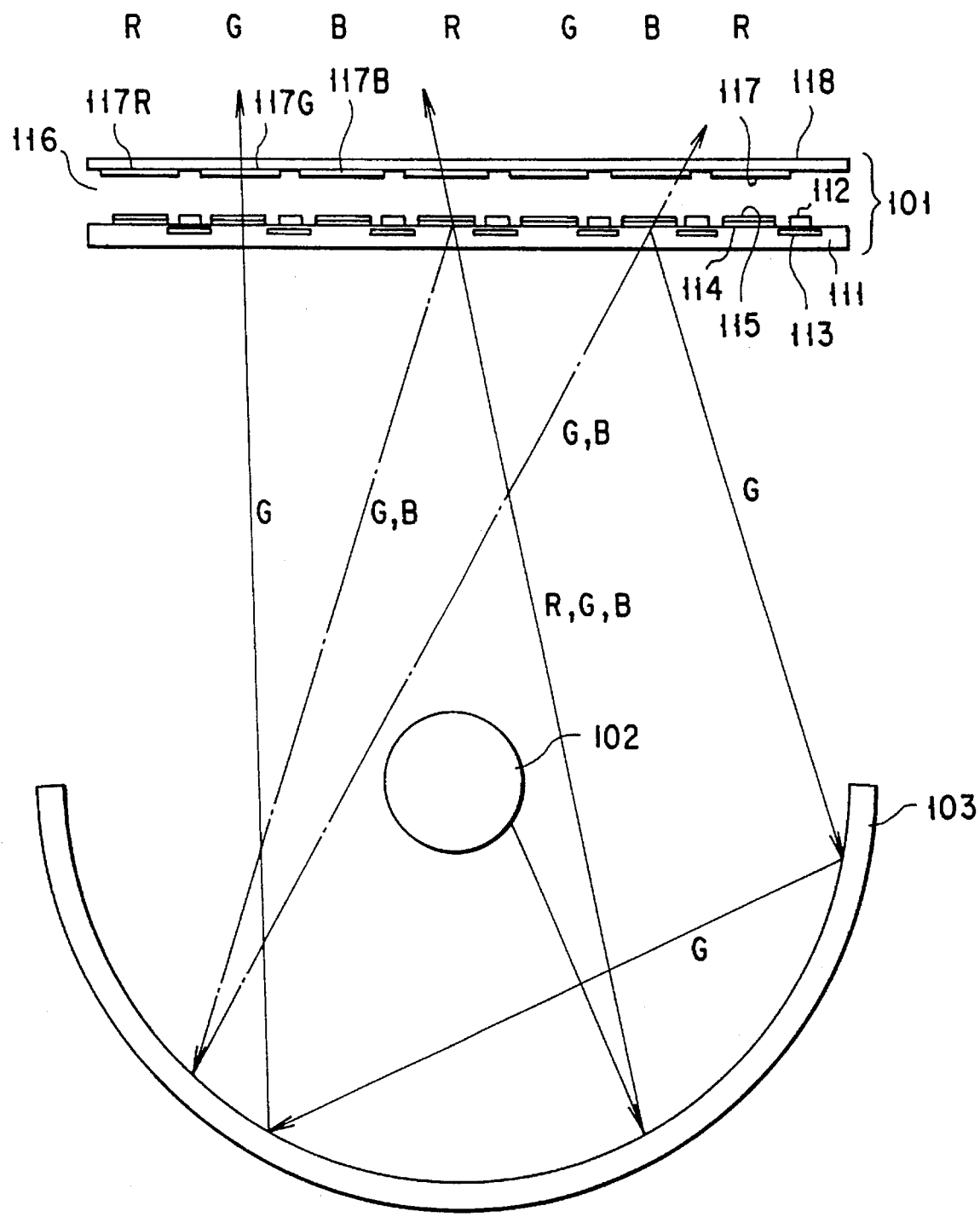
FIG. 14 is a cross sectional view showing a gist portion of a liquid crystal display device according to a tenth embodiment of the present invention.

FIG. 14 is a cross sectional view showing a gist portion of a liquid crystal display device according to a tenth embodiment of the present invention. In this embodiment, the technical idea of the present invention is applied to a liquid crystal display device of a projection type.

In the tenth embodiment, a projecting light source 102 and a mirror 103 are arranged below a TFT-LCD substrate 101, as shown in FIG. 14. The optical path is formed, for example, as follows in this embodiment. Specifically, the light emitted from the light source 102 is reflected by the mirror 103 to reach the interference filter 114R which selectively transmits the red light component of the incident light. In this case, the red light component is selectively transmitted through the interference filter 114R, with the green and blue light components being reflected by the filter 114R. Then, these green and blue light components are reflected again by the mirror 103 to reach the interference filter 114B which selectively transmits the blue light component of the incident light. In this case, the blue light component is selectively transmitted through the interference filter 114B, with the remaining green light component being reflected by the filter 114B. Further, the green light component is reflected by the mirror 103 to reach the interference filter 114G which selectively transmits the green light component. Naturally, the green light component is transmitted through the interference filter 114G. It follows that all of the R-, G-, B-components of the light emitted from the light source 102 are utilized in this embodiment. It is desirable to set the reflectance of the interference filter at a high level close to 100%.

In the optical path exemplified above, each of the R-, G-, B-components of the incident light is entirely transmitted when the light is incident to the corresponding interference filter. Also, the light utilization efficiency can be made close to 100% by allowing the incident light to be reflected repeatedly several times by the interference filter and the mirror such that each of the R-, G-, B-components of the incident light is entirely transmitted in the final stage.

The particular construction of the tenth embodiment shown in FIG. 14 permits decreasing the number of parts of the liquid crystal display device such as the prisms, mirrors, lenses, arrays and driving circuits to ⅓ of that in the conventional device of 3-plate type, leading to a low manufacturing cost of the liquid crystal display device.

EXAMPLE 11

Figure 15:
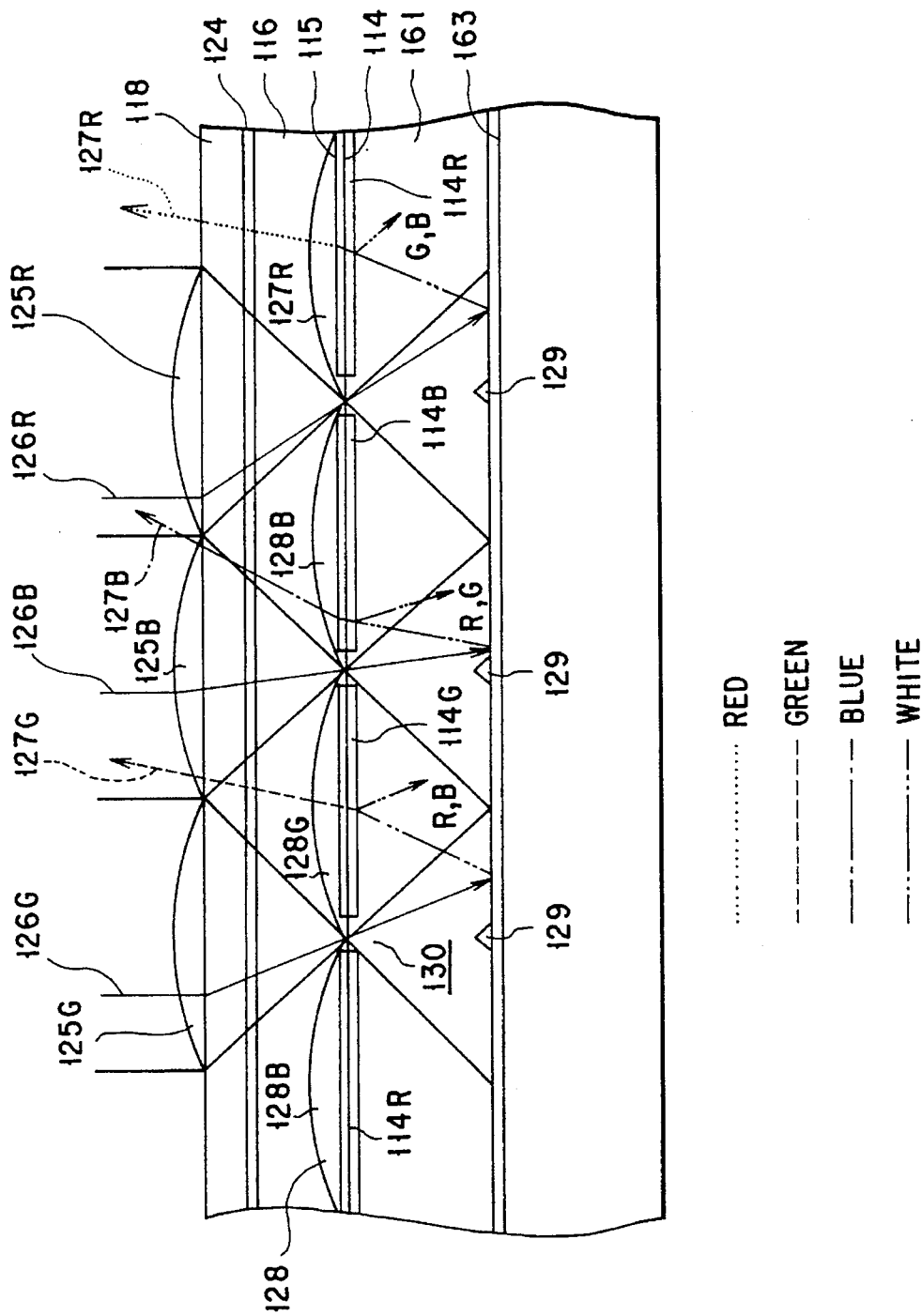
FIG. 15 is a cross sectional view showing a gist portion of a liquid crystal display device according to an eleventh embodiment of the present invention.

FIG. 15 is a cross sectional view showing a gist portion of a liquid crystal display device according to an eleventh embodiment of the present invention. In this embodiment, wavelength selective interference filters 114, i.e., 114R, 114G, 114B, and ITO pixel electrodes 115 are formed a transparent glass substrate 161. Also, a transparent electrode 124 is formed on the entire surface of the counter electrode 118. An orienting layer is formed on the surface of each of these two substrates, and a liquid crystal material 116 is sealed between these two electrodes so as to form a TFT-liquid crystal cell. Further, microlens arrays 125, i.e., 125R, 125G, 125B, are formed on the counter substrate 118.

A light flux 126 coming from the outside is incident first to, for example, a green pixel, converged by the microlens array 125G, transmitted through a slit 130 formed between the interference filters 114R and 114G, reflected by a reflective plate 163, transmitted through the interference filter 114G which selectively transmits the green component of the light 127G, controlled by a liquid crystal cell 116, converged by a converging lens 128G and, then, emitted to the outside through a clearance between the lenses 125G and 125B. On the other hand, the red and blue light components reflected by the interference filter 114G are repeatedly reflected similarly within the liquid crystal display device such that these light components are transmitted through the interference filters 114R and 114B so as to be emitted finally to the outside.

The particular construction described above permits providing a liquid crystal display device of a reflection type, which produces an effect similar to that produced by the embodiments described previously. Incidentally, it is also possible to provide a light-scattering member 129 so as to prevent an external light from being reflected directly.

The interference filter may be formed by laminating transparent films differing from each other in refractive index. A metal oxide film such as a film of multilayer of low reflection index/high reflection index like $(SiO_2/TiO_2)_n$ or a transparent resin film can be used as the transparent film. It is also possible to use a holographic filter as an interference filter. The holographic filter can be formed by radiating various laser lights having different wavelength to light sensitive material. It suffices to provide interference filters for red, green and blue components of light for each pixel. For forming the interference filter, an interference filter for a certain color may be formed first on the entire surface of a substrate, followed by selectively removing by etching the filter thus formed from the region other than the desired pixel region. Alternatively, a laminate structure of resin layers differing from each other in refractive index may be formed by, for example, electrodeposition selectively on a desired pixel region so as to form an interference filter of a desired color. Vapor evaporation under vacuum or sputtering may also be employed for forming the interference filter in addition to the electrodeposition method noted above. These methods of forming an interference filter, which can be applied to the eleventh embodiment shown in FIG. 15, can also be applied similarly to the other embodiments of the present invention described previously.

The technical idea of the present invention, which is applied to a TFT-LCD in the embodiments described above, can also be applied to liquid crystal display devices of other types such as devices of MIM, simple matrix type, etc. Also, the eleventh embodiment shown in FIG. 15 can also be applied to liquid crystal display devices of other types using a color filter. The display may be either a direct-view type or a projection type. The light source used in the present invention need not be restricted to R-, G-, B-components of light. Any type of light source can be used as far as the light contains components having a required wavelength. However, in order to reduce the manufacturing cost by lowering the performance of the spectroscope such as prisms, interference filters or diffraction gratings, it is desirable to use a line spectrum light source having a narrow range of wavelengths. In this case, the wavelength of the line spectrum light source should desirably be closer to the central wavelength of any of R-, G-, B-components of light. In the eleventh embodiment shown in FIG. 15, the intensity of the reflected light is weakened toward the central region of the display device. Thus, it is desirable to have the light-scattering body 129 and the transparent open portion enlarged toward the central region of the display device so as to make the reflected light uniform in intensity like FIG. 13B.

As described above, in the liquid crystal display device of the present invention, the light flux emitted from a light source is converged to have a width less than about ⅓ of the width of the light flux emitted from the light source. Then, the converged light flux is separated into its R-, G-, B-components. Further, transmittance of each of the separated light components is controlled by a liquid crystal. Where the liquid crystal display device is of a reflection type, the light components passing through the liquid crystal are reflected by a reflective plate to allow the reflected light components to run in the opposite direction through the optical paths of the incident light components. The reflected light components are converged again for use as a display light.

The particular construction of the present invention makes it possible to utilize all the components of the light emitted from the light source. It follows that the present invention permits improving the light utilization efficiency to about 3 times as high as that in the conventional system utilizing a color filter. Also, in the case of using a TN type liquid crystal, the light is enabled to be incident in a direction close to a direction perpendicular to the substrate surface so as to diminish the view angle dependency of the liquid crystal display device. In practice, the incident direction of light need not be strictly perpendicular to the substrate surface. For example, a deviation of less than about 10° from the perpendicular direction brings about no practical problem or preferably 5° deviation.

Further, the particular construction of the present invention makes it possible to provide a color liquid crystal display device of a direct-view type or a projection type, which exhibits a high brightness, which permits saving the power consumption, and which can be manufactured with a low cost.

The present invention also provides a liquid crystal display device comprising interference filters for separating the light emitted from a light source into its red, green and blue components and a reflective plate. In the device of this type, the incident light is repeatedly reflected by the interference filters and the reflective plate such that the red, green and blue components of the incident light are finally transmitted through the interference filters of the corresponding colors. In this case, all of the red, green and blue components of the incident light can be utilized for the display. It follows that the present invention makes it possible to provide a color liquid crystal display device of a direct-view type or a projection type, which exhibits a high brightness, which permits saving the power consumption, and which can be manufactured with a low cost.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A liquid crystal display device, comprising:

light-converging means provided for each pixel or each pixel row consisting of a plurality of pixels for converging light incident from outside of the device.;

first light path converting means for converting the converged light into a parallel light;

light separating means for separating the parallel light into its red-, green- and blue-light components, said light separating means being formed of a diffraction grating having a concave surface;

a transparent substrate formed of a material having a relatively large refractive index for converting each of the light components separated by said light separating means into a parallel light;

a liquid crystal cell for controlling an amount of each light component transmitted;

control means for controlling the light transmittance of the liquid crystal cell for a plurality of pixels by applying a voltage to the liquid crystal cell; and reflecting means for reflecting the light transmitted through the liquid crystal cell such that the reflected light is incident to the liquid crystal cell along a light path that is substantially the same light path of the light incident from outside of the device.

2. The liquid crystal display device according to claim 1, which comprises a prism as a means for converting each of the light components separated by said light separating means into a parallel light.

3. The liquid crystal display device according to claim 1, which comprises a lens as a means for converting each of the light components separated by said light separating means into a parallel light.

4. A liquid crystal display device, comprising:

a liquid crystal cell including a pair of substrates consisting of a first substrate, a second substrate, and a liquid crystal material sandwiched between the pair of said substrates, the light transmittance of said liquid crystal material being changed by voltage application;

a pixel electrode formed on one of said first and second substrates;

first color decomposition filters formed on said first substrate for selectively transmitting only those components of the light emitted from a light source which have predetermined wavelengths differing from each other; and reflecting means for reflecting a light component transmitted through said first color decomposition filters toward the liquid crystal cell.

5. The liquid crystal display device according to claim 4, which further comprises a reflection-preventing film formed on the outer surface of said first substrate.

6. The liquid crystal display device according to claim 4, wherein said light source is surrounded by a mirror.

7. The liquid crystal display device according to claim 4, wherein said reflecting means comprises a light conductive plate and a plurality of light-scattering bodies disposed a predetermined space apart from said light conductive plate, a width of a light-scattering body being increased with increase of distance of said light-scattering bodies from said light source.

8. The liquid crystal display device according to claim 4, wherein a plurality of mirrors are formed a predetermined distance apart from each other on a surface of said second substrate opposite said color decomposition filters, the distance between said mirrors being increased with an increase of distance between said reflecting means and said light source.

9. The liquid crystal display device according to claim 4, further including second color decomposition filters formed on said second substrate for transmitting another light component to said first color decomposition filters.

* * * * *